Oct. 13, 1970 MORIO ONOE ET AL 3,534,297

ELECTROMECHANICAL BAND-SEPARATION NETWORKS INCLUDING LONGITUDINALLY VIBRATING RESONATORS AND BENDING COUPLERS

Filed Dec. 23, 1968

INVENTORS
Morio Onoe
Takeshi Yano
BY
Marn & Jangarathis
ATTORNEYS

United States Patent Office 3,534,297
Patented Oct. 13, 1970

3,534,297

ELECTROMECHANICAL BAND-SEPARATION NETWORKS INCLUDING LONGITUDINALLY VIBRATING RESONATORS AND BENDING COUPLERS

Morio Onoe and Takeshi Yano, Tokyo, Japan, assignors to Nippon Electric Company Limited, Tokyo, Japan Filed Dec. 23, 1968, Ser. No. 786,134
Claims priority, application Japan, Dec. 28, 1967, 43/84,480
Int. Cl. H03h 7/08, 7/46, 9/26
U.S. Cl. 333—6 7 Claims

ABSTRACT OF THE DISCLOSURE

An electromechanical band-separation network for translating a first alternating current carrier signal extending over a predetermined frequency band having a preassigned center frequency into a plurality of other alternating current carrier signals extending over certain frequency bands, each having a center frequency different from the others and from the first signal center frequency, including a plurality of elongated cylindrical or rectangular bar transducers arranged in a plurality of individual transducer arrays in one plane and excited by the first signal carrier current to resonate at frequency bands having the different center frequencies for deriving from the respective transducer arrays the plurality of other signal carrier currents.

Figure 1:
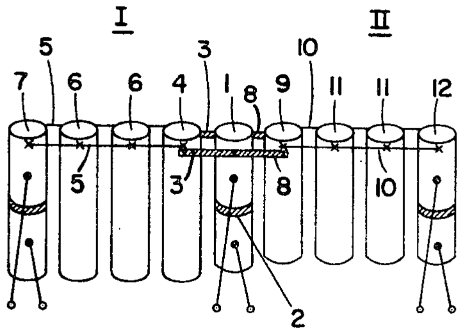

This invention relates to band-separation networks and more particularly to electromechanical band-separation networks of the kind consisting of a combination of longitudinally vibrating resonators and coupling wires or rods adapted for bending mode vibrations.

Purely electrical band-separation networks consisting of inductors and capacitors for separating an electrical input into a plurality of electrical outputs differing in the frequency components from one another have played an important role in communication systems such as carrier telephony. The present invention is concerned with mechanical network structures to perform the equivalent function by electromechanical transducing and mechanical filtering means.

More specifically, the electromechanical band-separation networks of the invention are featured by a particular multi-furcated structure of extremely compact design, in which bar-shaped longitudinally vibrating resonators (including a longitudinally vibrating side transducer) constitute one of the sub-structures branching out from the main transducer with all of their axes parallel to one another and in the same plane, and couplers in the form of bridging wires or strips or coupling rods, which are adapted for bending mode vibrations, are connected across two adjacent resonating elements in succession in a direction that is substantially perpendicular to the axial direction of these resonating elements.

This particular structure is eminently suitable, as will be detailed later, for the design of mechanical band-separation networks having passband center frequencies above 50 kHz. and specific passband widths (ratio of the passband width to the passband center frequency) ranging from an extremely small value such as 0.1% to a medium value such as 5% and notably, for the design of networks having specific passband widths of the order of 0.1 or having combined-narrow-and-medium passband widths including such small specific passband widths. As will be detailed hereinafter, this latter modification can be easily performed by controlling the diameter or diameters of some of the bending couplers. It being appreciated, that, the narrowness of passband widths of this order could hardly be realized, to attain conventional, with purely electrical band-separation networks.

It is a well established fact that the mechanical coupling coefficient, or a measure for ease of transfer of mechanical energy from one resonator to the other, of a bending coupler which connects two longitudinally vibrating resonators in a direction perpendicular to the direction of the axes of the resonators varies markedly with changes in diameter of the bending coupler. This signifies that mechanical vibratory energy transmitted from one resonator to the other can be easily controlled by suitably selecting the diameter of the bending coupler.

The basic concepts underlying this invention which are based on theoretical and experimental research may be summed up as follows:

The coupling coefficients of bending couplers which connect the main transducer to all sub-structures (referred to as primary bending couplers hereinafter) are for providing necessary passband spacings for the network, while the coupling coefficients of bending couplers which connect any two adjacent resonators or the side transducer to its adjacent resonator (referred to as secondary bending couplers hereinafter) in each sub-structure are for providing necessary passband widths for the network.

The coupling coefficients (or diameters) of the primary bending couplers should be much larger than the coupling coefficients (or diameters) of the secondary bending couplers in order to realize band-separation networks for which two conditions, i.e., considerably wide passband spacings and narrow passband widths are required.

The present invention indicates that this particular structure is the best of all conceivable structures in that the mechanical coupling coefficients of the primary and secondary bending couplers can be controlled with ease throughout a wide range.

Accordingly an object of this invention is to provide new and improved electromechanical band-separation networks capable of separating an incoming signal into any desired number of passbands and adapted for narrowing some or all of the specific passband widths in relation to the passband spacings so as to meet the frequency requirements of desired applications.

Another object of this invention is to provide such electromechanical band-separation networks featured by compactness and reduction in manufacturing costs as compared with band-separation networks of the conventional design in which a plurality of two-part mechanical filters are electrically connected in parallel.

In accordance with one feature of this invention, all resonating members in each sub-structure as well as the main transducer are of geometrical shapes adapted for longitudinal mode vibrations.

As will be evident to one skilled in the art, this particular vibration mode is most appropriate in that these resonating elements can assume reasonably compact and easily handling sizes in the carrier frequency range, arrays of these elements can be easily supported without any adverse effect on the vibrations, and the longitudinal vibrations can be most easily coupled to bending mode vibrations of the bending couplers.

In accordance with another feature of this invention, the structure calls for installation of two different kinds of bending couplers, primary and secondary, differing in diameter (or equivalent diameter) as mentioned previously.

Generally speaking, even the bending couplers of the same kind need to be varied in diameter so as to meet band-separation characteristic requirements, but in some cases, as with the illustrative embodiments explained hereinafter, bending couplers of the same kind may be substantially of the same diameter.

The ratio (or ratios) of the diameters of the primary and secondary bending couplers will be determined in a manner and for the reasons of numerical clarification.

Figure 2:
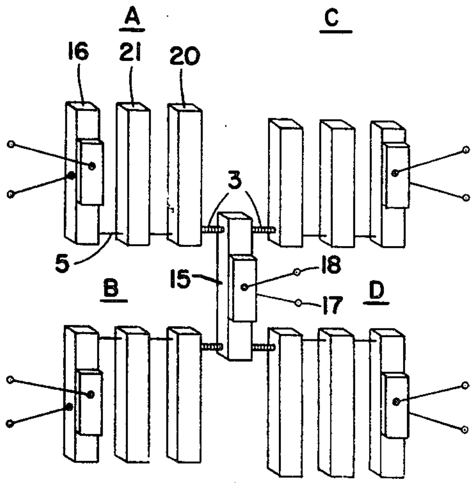

The spirit of this invention and these and other objects, features, and advantages will be apparent from a consideration of the following detailed description of the two typical embodiments illustrated in the accompanying drawing, wherein:

FIG. 1 is a perspective view of a carrier-extracting filter for use in carrier equipment as one embodiment of this invention; and FIG. 2 is a perspective view of a carrier-extracting filter for use in carrier equipment as another embodiment of this invention.

Designed to separate an input frequency band centered at 82 kHz. into 80 kHz. and 84 kHz. bands (bandwidths are each 100 Hz.), the embodiment of FIG. 1 constitutes a bifurcated mechanical network structure that can supersede its purely electrical equivalent.

The main transducer 1, as well as each of side transducers 7 and 12, is composed of two circular cylindrical segments of an iron-nickel alloy and a piece of poled ferroelectric ceramic 2 sandwiched therebetween as sometimes referred to as a Langevin type transducer. An electrical input applied to the main terminal pair is converted by the poled ferroelectric ceramic into mechanical vibrations in the longitudinal mode and the energy is divided by bridging wires (primary bending couplers) 3 and 8 to excite the two resonators 4 and 9 into longitudinal mode vibrations. With this embodiment, the primary bending couplers 3 and 8 of same diameter and the secondary bending couplers 5 and 10 also of the same diameter are installed on each side (front and rear) of the structure. Although they may be installed on one side alone, the former practice is decidedly preferred in that the possibility of transmission of unwanted modes of vibrations from one element to the adjacent can be eliminated and the coupling coefficients can be stabilized.

The heights of resonators 4–6–6 and side transducer 7, each in the shape of a circular cylinder, in the left-hand side sub-structure (I) and those of resonators 9–11–11 and side transducer 12 in the right-hand side sub-structure (II) have been dimensioned so as to be resonant at or near the passband center frequencies $f_{01}$ and $f_{02}$ (or 80 kHz. and 84 kHz.), respectively. Thus the substructure (I) transmits mechanical vibratory energy at or near $f_{01}$ better than at others, whereas the sub-structure (II) transmits mechanical vibratory energy at or near $f_{02}$ better than at others. This results in a most prominent appearance of electrical oscillation outputs at or near $f_{01}$ and $f_{02}$ from the two side terminal pairs 7 and 2, respectively.

The reason why electrical performance requirements of carrier-extracting filters calls for such a preferred structure as shown in FIG. 1 is analyzed below. According to our theoretical and experimental study using many experimental models similar to that shown in FIG. 1, it has been proven that the coupling coefficients $k_1$ and $k_1'$ of primary bending couplers 3 and 8 bridging across the main transducer and the two sub-structures must be selected, in order to realize mechanical carrier-extracting filters of the bifurcated network structure, approximately equal to 1.4 times $f_{02}-f_{01}/f_0$, which is apparently unrelated to the passband widths requirement, where $f_0$=passband center frequency i.e.

$$\left(k_1=k_1'=1.4\times\frac{84-80}{82}=1.4\times\frac{4}{82}\div 1.4\times 1/20\right)$$

while the coupling coefficients $k_2$ and $k_2'$ of secondary bending couplers 5 and 10 for connecting any two adjacent resonators or the side transducer and its adjacent resonator in the left and right sub-structures must be chosen approximately equal to $W_1/f_{01}$ and $W_2/f_{02}$, respectively. (Note that $W_1$ and $W_2$ denote the two passband widths; numerically $$k_2=W_1/f_{01}=100\text{ hz./80 kHz.}=\frac{1}{800}$$

and $$\left.k_2'=W_2/f_{02}=100\text{ hz./84 kHz.}=\frac{1}{840}\right)$$

It will be seen that both $k_2$ and $k_2'$ are unrelated to the passband spacing $f_{02}-f_{01}$. Since the ratios of the two coupling coefficients $k_1/k_2$ and $k_1'/k_2'$ are equal to values as large as 56, the use of such bending couplers is extremely advantageous, because of the well established theory; i.e., that the coupling coefficient varies as the fourth power of the diameter, can be utilized. In other words, the electrical performance of this embodiment can be realized by selecting the diameter (or equivalent diameter) of the primary bending couplers equal to approximately three times the diameter of secondary bending couplers. In general, the need for increasing the difference between the two coupling coefficients, that is, increasing the difference in diameter of the primary and the secondary bending couplers will become more pronounced, as it could be readily presumed, in designing networks having narrower bandwidths and wider passband spacings such as carrier-extracting filters. While all component elements of the structure of FIG. 1, as well as the structure of FIG. 2, are made of an iron-nickel alloy unless otherwise designated, any suitable metal or alloy may be used, provided it has good temperature stability and a high mechanical Q.

Referring to FIG. 2, this carrier-extracting filter constitutes a quatre-furcated band-separation network to separate an input frequency band centered at 86 kHz. into 80 kHz., 84 kHz., 88 kHz., and 92 kHz. bands.

As illustrated, the two resonators and the side transducer in each sub-structure branched out from the main transducer constitute an array of bars 16, 20 and 21 in the shape of square prisms the axes of which are disposed parallel to one another and in the same plane. Both main and side transducers 15 and 16 are in the form of a square prism of an iron-nickel alloy with a strip of poled ferroelectric ceramic material 17 affixed on one surface after silver electrodes 18 have been baked on the opposite sides. This type of transducer is sometimes referred to as a longitudinally vibrating bar type transducer.

As will be evident from the illustration, there are used primary bending couplers 3 and secondary bending couplers 5 of substantially two different diameters for the same reasons as mentioned previously referring to the embodiment of FIG. 1.

Similar numerical relations as have been set forth for the previous embodiment hold for this network as regards the coupling coefficients of the primary and secondary bending couplers, passband spacings, and the passband widths.

While the number of resonators installed in each substructure of the embodiment of FIG. 1 is three and that of FIG. 2 is two, this number may be suitably increased when improved frequency selectivity of the band-separation network is desired. It will be also evident to those skilled in the art that some or all of the electromechanical transducers in either embodiment structure may be replaced with so many longitudinally vibrating type magnetostrictive transducers and that either structure may be made partly or wholly of a poled ferroelectric ceramic, provided pairs of metallic electrodes are suitably incorporated into the structure.

No mention has been made of the order of longitudinal vibration mode occurring in the main transducer or in the side transducer in the network shown in FIG. 1 or 2, assuming that the vibration is in the fundamental, however it will be evident that similar operation can be performed regardless of the ordinal number of longitudinal mode vibrations set up in these transducers.

While the principles of this invention have been described above in connection with the typical embodiments and their modifications, it will be apparent that numerous other generalized arrangements of multifurcated network structures may be devised by those skilled in the art without departing from the spirit and scope of the invention.

What is claimed is:

1. An electromechanical frequency-band separation network, comprising:

a plurality of bar transducers, each having a preassigned shape of cross-section including:

a main transducer excited with an alternating current carrier signal extending over a frequency bandwidth having a preassigned first center frequency for producing longitudinal mode vibrations therein, and a plurality of groups of other transducers, each group consisting of a plurality of said other transducers functioning as resonators; said main and other transducers spaced in alignment to dispose axes thereof in parallel in one plane;

primary bending coupler means mechanically connecting said main transducer to one of said other transducers in each of said other transducer groups and having an axis disposed perpendicularly to said parallel axes of said main and other transducers for simultaneously transmitting said longitudinal mode vibrations from said main transducer to said one other transducer in each of said other transducer groups;

secondary bending coupler means mechanically connecting said one other transducer to the remaining other transducers in each of said other transducer groups and having an axis disposed perpendicularly to said axes of said last-mentioned one and remaining other transducers for simultaneously transmitting said longitudinal mode vibrations from said last-mentioned one other transducer to said last-mentioned remaining other transducers in each of said other transducer groups; said one other and said remaining other transducers in each of said other transducer groups provided with such predetermined lengths as to be resonant at a frequency bandwidth having a preassigned second center frequency; said other transducer groups deriving at preselected further transducers thereof alternating current carrier signals extending over bandwidths having said preassigned second center frequencies different from each other and from said preassigned first center frequency;

and said primary coupler means being provided with such predetermined diameter as to control the frequency spacing between said derived signal frequency bandwidths and said secondary coupler means being provided with such predetermined diameter as to control the extent of said respective derived carrier signal frequency bandwidths; said primary coupler means diameter being greater than said secondary coupler means diameter.

2. The network according to claim 1 in which said plurality of groups of other transducers comprises two in number, each of said two groups including at least one of said preselected further other transducers whereat an alternating current carrier signal may be derived, said alternating current carrier signals comprising two in number and extending over said bandwidths having said preassigned different second center frequencies, and each of said preselected further other transducers being an output for one of last-mentioned signals.

3. The network according to claim 1 in which said bar transducers have a preassigned shape of cross-section which is circular.

4. The network according to claim 1 in which said bar transducers have a predetermined shape of cross-section which is rectangular.

5. The network according to claim 1 in which said plurality of groups of other transducers comprises four in number, each of said four other transducer groups including at least one of said preselected further other transducers whereat an alternating current carrier signal may be derived, said alternating current carrier signals comprising four in number, and each preselected further other transducer being an output for one of said last-mentioned signals.

6. The network according to claim 1 in which said predetermined diameter of said primary coupler means is approximately three times greater than said predetermined diameter of said secondary coupler means.

7. An electromechanical frequency-band separation network, comprising:

a plurality of bar transducers, each having a preassigned shape of cross-section, including:

a main transducer excited by an alternating current carrier signal extending over a frequency bandwidth having a first preassigned center frequency for producing longitudinal vibrations therein;

and four groups of other transducers, each group consisting of a plurality of said other transducers functioning as resonators; said main and said other transducers of each of said four other groups thereof spaced in alignment to dispose axes thereof in parallel in one plane;

primary bending coupler means mechanically connecting each of two opposite ends of said main transducer to one of said other transducers in each of two of said four other transducer groups and having axes disposed perpendicularly to said parallel axes of said main and other transducers for simultaneously transmitting said longitudinal mode vibrations from said main transducers to said one other transducer in each of said four groups thereof;

secondary bending coupler means mechanically connecting said one other transducer in each of said four groups thereof to the remaining other transducers in said last-mentioned respective four groups and having an axis disposed perpendicularly to said axes of said last-mentioned one other and remaining other transducers in said last-mentioned respective four groups for simultaneously transmitting said longitudinal mode vibrations from said last-mentioned one other transducer to said remaining other transducers in each of said four other transducer groups; said one other transducer and said remaining other transducers in each of said four other transducer groups provided with such predetermined lengths as to be resonant at a frequency bandwidth having a preassigned second center frequency; said four other transducer groups deriving at preselected further other transducers thereof four alternating current signals extending over frequency bandwidths having said preassigned second center frequencies in such manner that each latter frequency is different from the others and from said first center frequency;

and said primary coupler means being provided with such predetermined diameter as to control the frequency spacing between said derived signal frequency bandwidths and said secondary coupler means being provided with such predetermined diameter as to control the extent of said respective derived carrier signal frequency bandwidths; said primary coupler means diameter being greater than said secondary coupler means diameter.

References Cited

UNITED STATES PATENTS

| | | | |
|---|---|---|---|
| 2,955,267 | 10/1960 | Mason | 333—71 |
| 3,317,858 | 5/1967 | Tagawa | 333—6 |

PAUL L. GENSLER, Primary Examiner

U.S. Cl. X.R.

333—71